US009549345B2

(12) United States Patent
Shaikh et al.

(10) Patent No.: US 9,549,345 B2
(45) Date of Patent: Jan. 17, 2017

(54) SOLUTION TO IMPROVE RAN BANDWIDTH EFFICIENCY DURING VOLTE CALL SCENARIOS

(71) Applicant: Verizon Patent and Licensing Inc., Arlington, VA (US)

(72) Inventors: Imtiyaz Shaikh, Irving, TX (US); Niranjan B. Avula, Frisco, TX (US); Maria G. Lam, Oakland, CA (US); Priscilla Lau, Fremont, CA (US); Raymond Wai-Man So, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 243 days.

(21) Appl. No.: 13/936,939

(22) Filed: Jul. 8, 2013

(65) Prior Publication Data
US 2014/0256343 A1    Sep. 11, 2014

Related U.S. Application Data

(60) Provisional application No. 61/773,018, filed on Mar. 5, 2013.

(51) Int. Cl.
*H04W 28/22* (2009.01)
*H04L 12/24* (2006.01)
*H04L 29/06* (2006.01)

(52) U.S. Cl.
CPC .......... *H04W 28/22* (2013.01); *H04L 41/0896* (2013.01); *H04L 65/105* (2013.01); *H04L 65/1006* (2013.01); *H04L 65/1016* (2013.01); *H04L 65/1069* (2013.01); *H04L 65/80* (2013.01)

(58) Field of Classification Search
CPC .... H04W 72/048; H04W 28/26; H04W 72/10; H04W 28/0263; H04W 72/0493; H04W 72/087; H04W 72/0406; H04W 28/22; H04L 5/003; H04L 65/1006; H04L 65/1016; H04L 65/1069; H04L 65/80; H04L 65/105
USPC .......... 455/450, 452.1, 452.2; 370/328–329, 370/433, 456, 457, 459
See application file for complete search history.

(56) References Cited

U.S. PATENT DOCUMENTS

| 8,305,979 | B2 * | 11/2012 | Manning et al. ............. 370/329 |
| 8,400,916 | B2 * | 3/2013 | Cutler et al. ................. 370/230 |
| 8,605,583 | B2 * | 12/2013 | Cutler et al. ................. 370/230 |
| 8,675,487 | B2 * | 3/2014 | Siddam et al. ............... 370/235 |
| 2012/0064878 | A1 * | 3/2012 | Castro Castro et al. ..... 455/418 |

(Continued)

*Primary Examiner* — Magdi Elhag (57) ABSTRACT

Bandwidth for a radio access network may be efficiently allocated for certain voice over LTE (VoLTE) services. In one implementation, a request associated with traffic flows may be received. Each of the traffic flows may be associated with an amount of guaranteed bit rate (GBR) traffic. The method may further include selectively summing the GBR traffic, to obtain an aggregate bandwidth value. The method may further include reserving an amount of GBR bandwidth corresponding to the previous version of the aggregate bandwidth value when a comparison indicates that the aggregate bandwidth value is less than the previous version of the aggregate bandwidth value; and reservation an amount of GBR bandwidth corresponding to the aggregate bandwidth value when a comparison indicates that the aggregate bandwidth value is not less than the previous version of the aggregate bandwidth value.

20 Claims, 7 Drawing Sheets

(56) References Cited

U.S. PATENT DOCUMENTS

2014/0177535 A1* 6/2014 Tjandra et al. .............. 370/329

* cited by examiner

SOLUTION TO IMPROVE RAN BANDWIDTH EFFICIENCY DURING VOLTE CALL SCENARIOS

RELATED APPLICATIONS

The present application claims the benefit of U.S. Provisional Patent Application No. 61/773,018, titled "AVOIDANCE OF RAN BANDWIDTH WASTAGE IN VOLTE," which was filed on Mar. 5, 2013, and which is hereby incorporated by reference as though fully set forth herein.

BACKGROUND

The Long Term Evolution (LTE) standard is a standard for wireless communication of high-speed data for mobile devices and data terminals. LTE is based on the GSM/EDGE (Global System for Mobile Communications/Enhanced Data rates for GSM Evolution) and UMTS/HSPA (Universal Mobile Telecommunications System/High Speed Packet Access) network technologies. Relative to GSM/EDGE and UMTS/HSPA, LTE may increase the capacity and speed of the wireless network based on improvements to the radio interface and improvements to the core network.

The LTE standard is based on packet-switched IP networking and does not have inherent support for circuit-switched voice calls. The Voice Over LTE (VoLTE) standard is one approach that may be used to provide voice calls in a network based on LTE.

At the radio access network (RAN) level in an LTE network, base stations, called eNodeBs ("eNBs"), may include radios that provide wireless connectivity to mobile user devices, called user equipments (UEs). Voice calls implemented using VoLTE may require, at the RAN level, reservation of a guaranteed minimum bandwidth. Because the radio resources of an eNodeB are finite, it can be important to efficiently use the radio resources of the eNodeBs.

DETAILED DESCRIPTION OF PREFERRED EMBODIMENTS

The following detailed description refers to the accompanying drawings. The same reference numbers in different drawings may identify the same or similar elements.

Techniques described herein may provide for efficient usage of RAN bandwidth for certain VoLTE calls. In particular, in existing systems, during call waiting, call hold, 3-way calling, or other VoLTE call scenarios, excessive bandwidth may be reserved in guaranteed bit rate (GBR) traffic flows. For example, double or even thrice the needed bandwidth may be reserved. The extra reserved bandwidth may not be needed by a user equipment (UE), and may thus result in a wasting of RAN resources.

Figure 1:
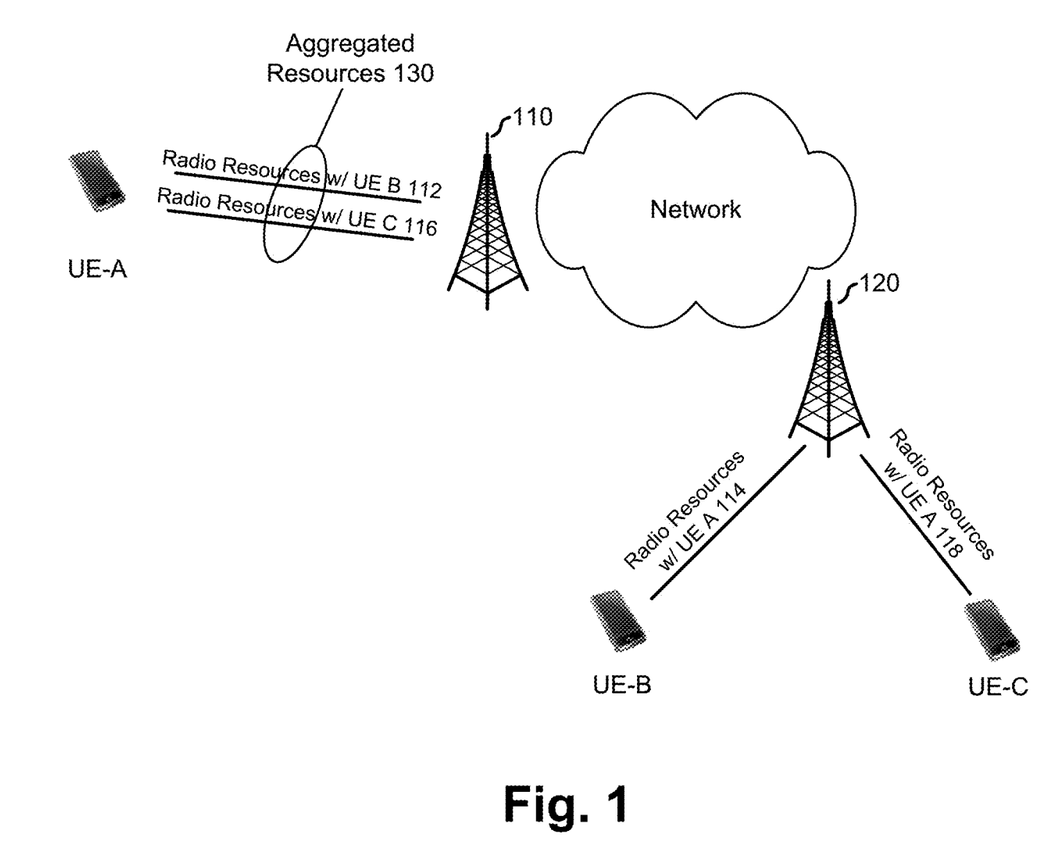
FIG. 1 is a diagram conceptually illustrating an example of an overview of concepts described herein.

FIG. 1 is a diagram conceptually illustrating an example of an overview of concepts described herein. As shown in FIG. 1, UE, labeled as UE-A, may be attached to a network through a base station 110 (e.g., an eNodeB). Additional UEs, labeled as UE-B and UE-C, may be attached to a different base station 120. Assume that UE-A initiates a telephone call with UE-B. The telephone call may be completed by the network using VoLTE implemented over LTE. The network may reserve a certain amount of radio resources (e.g., radio bandwidth) to support the telephone call. For instance, as illustrated, a first amount of radio resources (Radio Resources w/UE-B 112) may be reserved for the radio connection between UE-A and base station 110. A second amount of radio resources (Radio Resources w/UE-A 114) may be reserved for the radio connection between UE-B and base station 120.

At some point, assume that UE-C initiates a telephone call with UE-A, and that the operator of UE-A decides to put UE-B on hold. The network may reserve additional radio resources (Radio Resources w/UE-C 116) for the radio connection between UE-A and base station 110 and may reserve additional resources (Radio Resources w/UE-A 118) for the radio connection between UE-C and base station 120. With respect to the radio resources used between UE-A and base station 110, the total amount of reserved radio resources may be based on an aggregation of the radio resources, illustrated as aggregated resources 130.

The reservation of aggregated resources 130, however, may result in an inefficient usage of the RAN bandwidth, as the bandwidth actually used by the traffic flows with UE-B and UE-C may be significantly less than an amount of resources corresponding to aggregated resources 130. For instance, in this example, because the call to UE-B is on hold, the traffic flows to UE-B may require a relatively small amount of radio resources. Aggregated resources 130, in contrast, may be allocated to reserve enough bandwidth to support two simultaneous voice calls (e.g., significantly more than is actually necessary).

Consistent with aspects described herein, devices in the network may employ hysteresis when aggregating bandwidth for certain types of guaranteed bit rate (GBR) network traffic flows, such that one or more devices in the network may keep track of the last used bandwidth that is associated with a particular GBR bearer (e.g., UE-A). When determining the amount of resources to allocate to the particular bearer, the devices in the network may exclude certain traffic flows, such as all traffic flows in which a flow status of the flow indicates the flow is disabled, in aggregating the resources for the bearer. When the aggregate value is less than the last used bandwidth of the bearer, the last used bandwidth may be allocated at the base station. Otherwise, the aggregate value may be allocated.

In the example of FIG. 1, using concepts described herein, aggregated resources 130 may be allocated to include bandwidth to support a single voice call (e.g., the call with UE-C) plus a relatively moderate bandwidth allocation for control information associated with the call that is on hold (e.g., the call with UE-B). That is, the aggregated resources 130 may correspond to fewer resources than would be allocated for two full voice calls. In this manner, radio resources may be efficiently used.

Figure 2:
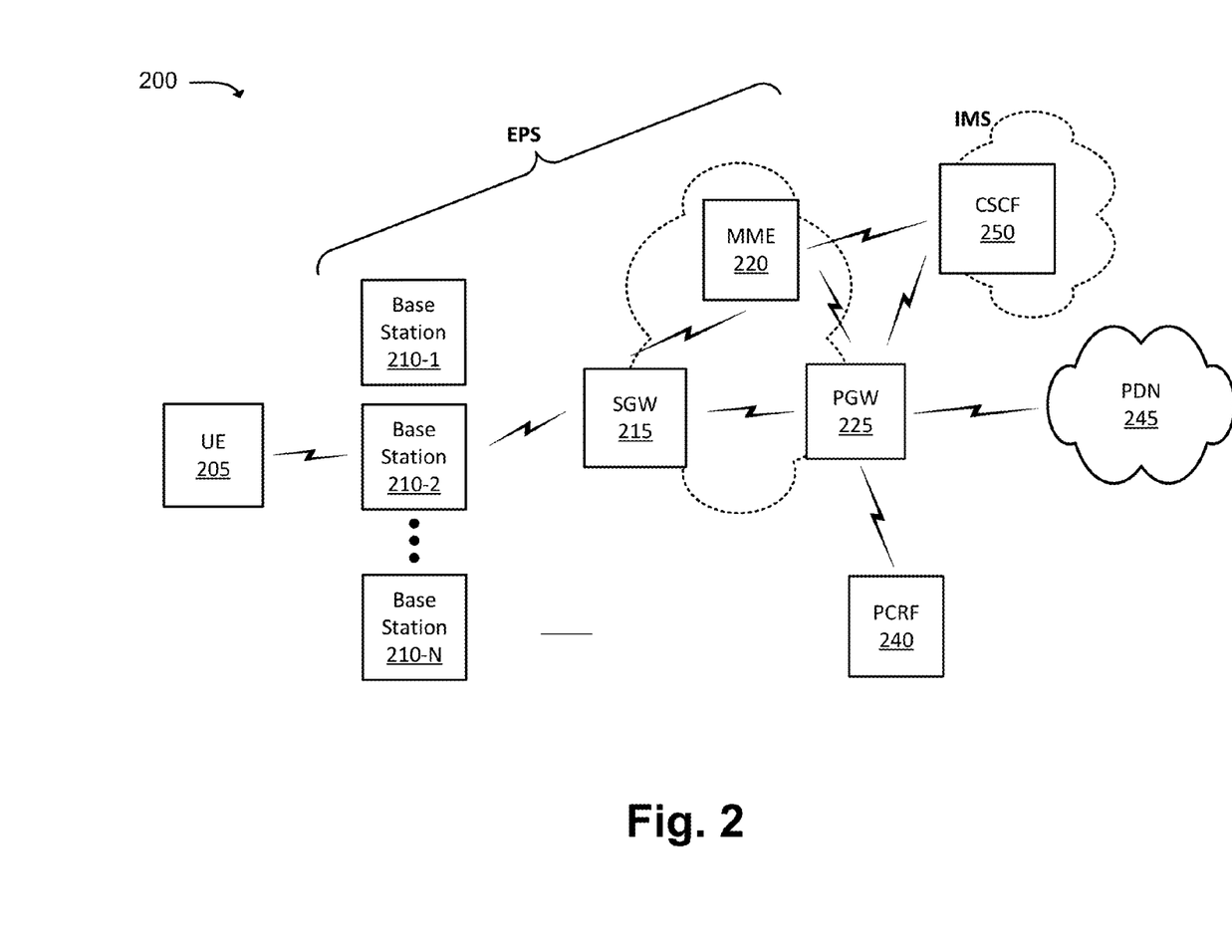
FIG. 2 illustrates an example environment in which systems and/or methods described herein may be implemented.

FIG. 2 illustrates an example environment 200, in which systems and/or methods described herein may be implemented. Environment 200 may represent a wireless communication system, such as a cellular network, in which voice and data sessions may be established. In one implementation, environment 200 may include an evolved packet system ("EPS") that includes a Long Term Evolution (LTE) network based on a third generation partnership project ("3GPP") wireless communication standard. Additionally, environment 200 may include an IP Multimedia Subsystem (IMS) architecture for delivering IP multimedia services. Voice calls in environment 200 may be implemented using the Voice over LTE (VoLTE) standard to provide voice calls over LTE and IMS.

As shown in FIG. 2, environment 200 may include UE 205 and base stations 210-1 through 210-N (where N is an integer greater than 1). Base stations 210-1 through 210-N may be hereinafter referred to collectively as "base stations 210," and individually as "base station 210." Base stations 210 may take the form of eNodeBs. Environment 200 may further include serving gateway (SGW) 215, mobility management entity (MME) 220, packet data network gateway (PGW) 225, policy charging and rules function (PCRF) 240, a packet data network (PDN) 245, and serving call session control function (CSCF) 250. CSCF 250 may be implemented as part of an IMS network.

UE 205 may include any computation and communication device, such as a wireless mobile communication device that is capable of communicating with base stations 210 over a radio (i.e., wireless) interface. For example, UE 205 may include a radiotelephone; a personal communications system (PCS) terminal (e.g., a device that combines a cellular radiotelephone with data processing and data communications capabilities); a personal digital assistant (PDA) (e.g., that can include a radiotelephone, a pager, Internet/intranet access, etc.); a smart phone; a laptop computer; a tablet computer; a camera; a personal gaming system, or another type of mobile computation and communication device.

Base stations 210 may include one or more network devices that receive, process, and/or transmit traffic, such as calls, audio, video, text, and/or other data, destined for and/or received from UE 205. Base stations 210 and UEs 205 may communicate over radio interfaces to form a radio access network (RAN) for environment 200. Base stations 210 may receive traffic from and/or send traffic to PDN 245 via SGW 215 and PGW 225.

Base stations 210 may be physically located to provide cellular coverage to UEs 205, such that a UE 205 may seamlessly move out of range of one base station 210 and into range of another base station 210. Each base station 210 may simultaneously provide radio connectivity to multiple UEs 205. With some network communication sessions a base station may allocate a guaranteed bit rate (GBR) for traffic to a particular UE 205. GBR traffic may be particularly useful for communication sessions that require a certain minimum bandwidth to guarantee acceptable quality. For example, real-time voice (e.g., such as VoLTE based voice sessions) or video communication sessions may suffer noticeable quality degradation if the actual bandwidth drops below a threshold level. Accordingly, certain traffic flows may be allocated as GBR traffic flows that have a guaranteed bandwidth on the radio link between an UE 205 and the corresponding base station 210. Because the total radio link bandwidth that can be provided by a UE 205 is finite, it may be desirable to not "waste" radio capacity by over-allocating (e.g., allocating more bandwidth than is necessary) bandwidth for a GBR connection.

SGW 215 may include one or more computation and communication devices that route and forward user data packets. SGW 215 may route and forward user packets and also act as a mobility anchor during inter-base station handoffs.

MME 220 may include one or more computation and communication devices that perform signaling in environment 200. MME 220 may, for example, be responsible for authenticating mobile devices 210, maintaining location information for mobile devices 210, and selecting a PGW 225 to service a particular mobile device 210. MME 220 may also operate to establish bearer channels associated with a session with UE 205, to hand off UE 205 from the EPS to another network, to hand off UE 205 from the other network to the EPS, and/or to perform other operations. MME 220 may perform policing operations on traffic destined for and/or received from UE 205.

PGW 225 may include one or more network devices, or other types of computation and communication devices, that gather, process, search, store, and/or provide information in a manner described herein. For instance, PGW 225 may aggregate traffic received from one or more SGWs 215, etc. and may send the aggregated traffic to PDN 245 and/or to another network. PGW 225 may also, or alternatively, receive traffic from PDN 245 and/or another network, and may send the traffic toward UE 205 via SGW 215 and/or base station 210. PGW 225 may also act as an interface for the IMS portion of environment 200 (e.g., for communications with CSCF 250).

CSCF 250 may include one or more computation and communication devices that process session initiation protocol (SIP) signaling in environment 200. CSCF 250 may represent functionality associated with a proxy-CSCF (P-CSCF) and/or a serving-CSCF (S-CSCF). With respect to the functionality of the P-CSCF, CSCF 250 may act as a SIP proxy that is the first point of contact for an IMS communication and may include a Policy Decision Function (PDF), which may authorize media plane resources e.g., quality of service (QoS) over the media plane. With respect to the functionality of the S-CSCF, CSCF 250 may act as the central node of the signaling plane for IMS services. CSCF 250 may provide routing services and determine to which application servers particular SIP messages will be forwarded.

PCRF 240 may include one or more server devices, or other types of devices, that aggregate information to and from the EPS network and/or other sources. PCRF 240 may receive information regarding policies and/or subscriptions from one or more sources, such as subscriber databases and/or from one or more users (such as, for example, an administrator associated with PCRF 240). PCRF 240 may receive QoS requirements, associated with VoLTE calls, from CSCF 250, and may create actionable charging and QoS rules, which may be forwarded to PGW 225.

PDN 245 may include one or more wired and/or wireless networks. For example, PDN 245 may include an Internet Protocol ("IP")-based PDN. PDN 245 may include, for example, a wide area network such as the Internet, or one or more other networks. UE 205 may connect, through PGW 225, to data servers, application servers, or to other servers/applications that are coupled to PDN 245.

The quantity of devices and/or networks, illustrated in FIG. 2, is provided for explanatory purposes only. In practice, there may be additional devices and/or networks; fewer devices and/or networks; different devices and/or networks; or differently arranged devices and/or networks than illustrated in FIG. 2. Alternatively, or additionally, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
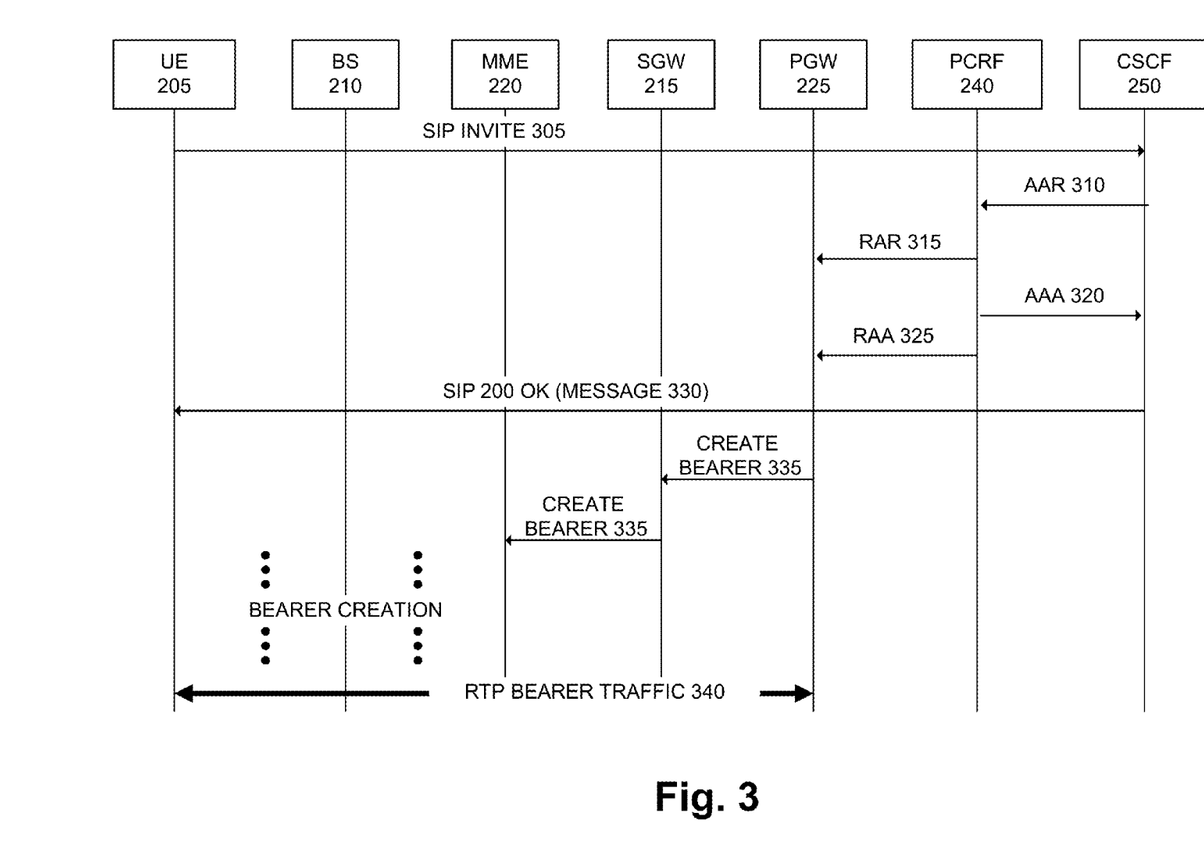
FIG. 3 is a diagram illustrating of signaling in an environment for a VoLTE call.

FIG. 3 is a diagram illustrating signaling in environment 200 for a VoLTE call placed from a UE. The signals illustrated in FIG. 3 may particularly include signals exchanged through the components of FIG. 2, including UE 205, base station (BS) 210, MME 220, SGW 215, PGW 225, PCRF 240, and CSCF 250.

For the signaling shown in FIG. 3, assume that UE 205 establishes a VoLTE audio call with another UE. UE 205 may initiate the call via a SIP invite message 305. SIP invite message 305 may be received by CSCF 250 (e.g., via transmission through BS 210 and SGW 215), which may respond, to PCRF 240, with an acknowledgment reservation request (AAR) message 310. CSCF 250 may determine the contents of AAR message 310 based on interaction with a VoLTE application server in the IMS network (or the VoLTE application server may itself generate AAR message 310). AAR message 310 may include a media component description, which may include a number of attribute-value-pairs (AVPs) describing the traffic flows that are being requested. For a VoLTE call, for instance, two traffic flows may be requested: a Real-time Transport Protocol (RTP) flow and a RTCP (RTP Control Protocol) flow. RTP is a standardized packet format for delivering audio and video over IP networks. While RTP carries the media streams (e.g., an audio stream), RTCP may be used to monitor transmission statistics and Quality of Service (QoS) and may aid in the synchronization of multiple streams. An example of a media component description (including a number of AVPs), that may be included in AAR message 310, is illustrated in Table I, below.

TABLE I

| AVP | Value |
| --- | --- |
| Media-Component-Number | 1 |
| Media-Type | AUDIO |
| Max-Requested-Bandwidth-UL & Max-Requested-Bandwidth-DL | 38000 |
| Flow-Status | ENABLED |
| RR-Bandwidth & RS-Bandwidth | 0 |
| Media-Sub-Component AVP for RTP, Flow-Number | 1 |
| Media-Sub-Component AVP for RTCP, Flow-Number | 2 |

As shown in Table I, the media component description may include type "audio" (e.g., telephone call), and the flow status for the requested traffic flow has a flow status of "enabled." Media sub-components are indicated for an RTP stream and a RTCP stream, corresponding to a traffic flow to deliver the call audio and a traffic flow to communicate control information corresponding to the call. Additionally, the requested bandwidth is 38,000 bits-per-second (bps).

Referring back to FIG. 3, PCRF 240 may generate Re-Authenticate-Request (RAR) message 315, which may be transmitted to PGW 225. RAR message 315 may cause the installation of two charging rules (corresponding to the RTP and RTCP streams). The charging rules may trigger the creation of dedicated bearer flows for the VoLTE call. Each charging rule may be specified using one or more AVPs. An example of AVPs for the first charging rule, corresponding to the RTP stream, is illustrated in Table II. An example of AVPs for the second charging rule, corresponding to the RTCP stream, is illustrated in Table III.

TABLE II (Charging Rule for Audio RTP)

| AVP | Value |
| --- | --- |
| Media-Component-Number | 1 |
| Flow-Number | 1 |
| Flow-Status | Enabled |
| QCI | 1 |
| GBR-UL & GBR-DL | 38000 |
| MBR-UL & MBR-DL | 38000 |

TABLE III (Charging Rule for Audio RTCP)

| AVP | Value |
| --- | --- |
| Media-Component-Number | 1 |
| Flow-Number | 2 |
| Flow-Status | ENABLED |
| QCI | 1 |
| GBR-UL & GBR-DL | 0 |
| MBR-UL & MBR-DL | 0 |

As shown in Tables II and III, the GBR bandwidth that is to be reserved may be 38,000 bps for the RTP stream (uplink and downlink direction) and zero for the RTCP stream. The Flow-Status attribute is enabled for both streams.

Referring back to FIG. 3, PGW 225, PCRF 240, and CSCF 250 may exchange additional messages relating to the establishment of the VoLTE call, including AAA message 320 and RAA message 325. When the call is determined to be authorized, a SIP 200 OK message (message 330) may be sent to UE 205. PGW 225 may then send Create Bearer Request message 335 to SGW 215, which may cause the creation of the bearer traffic flow. The created bearer traffic flow is illustrated as RTP bearer traffic 340, which may represent the traffic flow over which the voice call is implemented. The required bandwidth for the created bearer traffic flow may be calculated by PGW 225 by aggregating the requested bandwidth of all the GBR flows in the charging rules. In this example, there are two charging rules, of which the first charging rule (Table II, charging rule for audio RTP) includes a non-zero (38,000 bps) GBR bandwidth request. This may thus be the bandwidth allocated on the RAN interface between UE 205 and BS 210.

Figure 4:
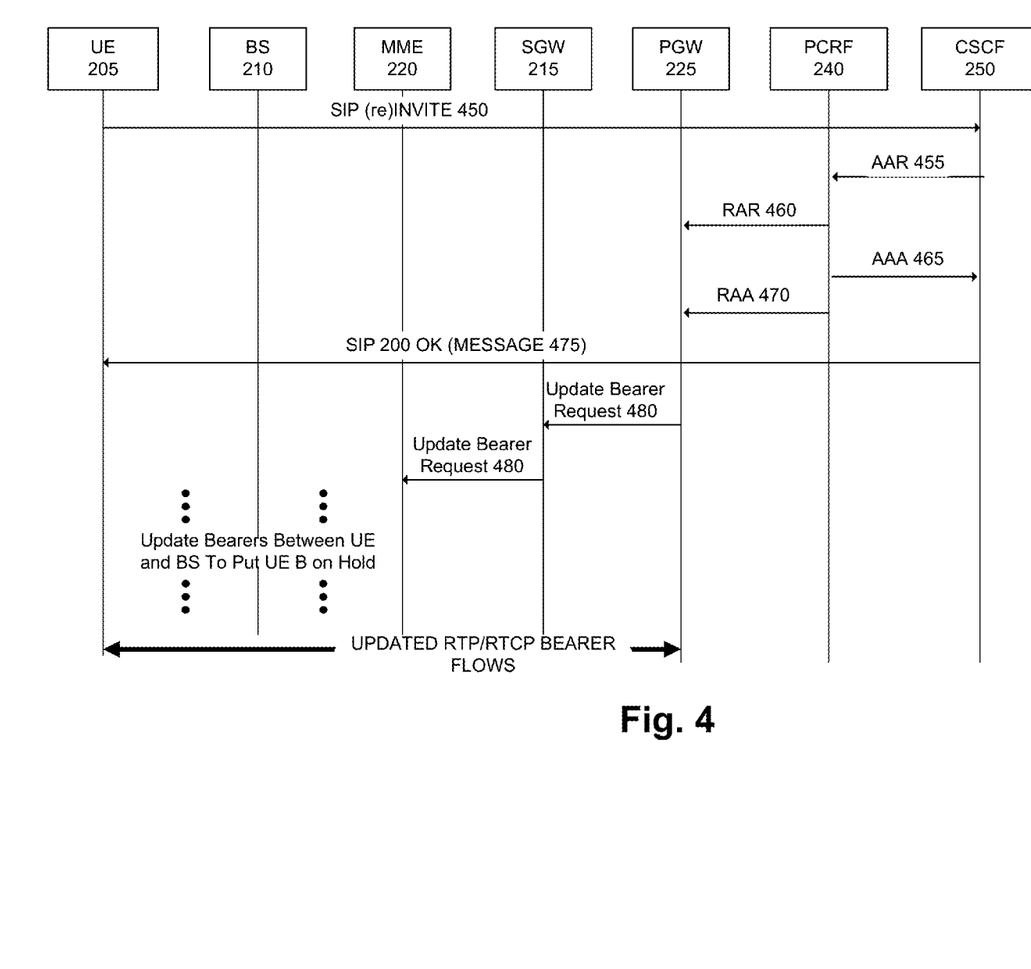
FIG. 4 is a diagram illustrating signaling in an environment in a VoLTE call waiting scenario.

FIG. 4 is a diagram illustrating signaling in environment 200 in a VoLTE call waiting scenario. For example, a first UE may have placed a VoLTE call to a second UE pursuant to the signaling shown in FIG. 3. Subsequently, a third UE may place a call to the first UE, which may accept the call and place the second UE on hold. The signals illustrated in FIG. 4 may particularly include signals exchanged through the components of FIG. 2, including UE 205, BS 210, MME 220, SGW 215, PGW 225, PCRF 240, and CSCF 250.

UE 205, which may correspond to the first UE (e.g., the UE that is currently in a call with a second UE-And would like to place the second UE on hold), may initiate the call hold via a SIP (re)invite message 450. SIP (re)invite message 450 may be received by CSCF 250, which may respond, to PCRF 240, with AAR message 455. AAR message 455 may include a media component description similar to the media component descriptions described above with reference to FIG. 3. An example of the AVPs that may be in the media component description, as transmitted in AAR message 455, are illustrated in Table IV, below.

TABLE IV

| AVP | Value |
|---|---|
| Media-Component-Number | 1 |
| Media-Type | AUDIO |
| Max-Requested-Bandwidth-UL & Max-Requested-Bandwidth-DL | 38000 |
| Flow-Status | DISABLED |
| RR-Bandwidth & RS-Bandwidth | 1900 |
| Media-Sub-Component AVP for RTP, Flow-Number | 1 |
| Media-Sub-Component AVP for RTCP, Flow-Number | 2 |

With reference to Table IV, the media component description may include type "audio" (e.g., telephone call), and the maximum requested bandwidth is indicated as 38,000 bps. In contrast to the media component description for the regular (e.g., non-held) call, illustrated in Table I, the flow status may be "disabled" instead of "enabled," because, for a call on hold, a real-time transport traffic flow is not necessary (i.e., no audio is transmitted). The fields "RR-Bandwidth" and "RS-Bandwidth" are shown as being set to 1900. This may correspond to the bandwidth that is allocated for an RTCP flow that may be used to exchange control information relating to the held call (e.g., information that may indicate when the call is to be disconnected or changed to a non-hold state).

Referring back to FIG. 4, PCRF 240 may generate RAR message 460, which may be transmitted to PGW 225. RAR message 460 may cause the installation of two charging rules (corresponding to the RTP and RTCP streams). Each charging rule may be specified using one or more AVPs. An example of AVPs for the first charging rule, corresponding to the RTP stream, is illustrated in Table V. An example of AVPs for the second charging rule, corresponding to the RTCP stream, is illustrated in Table VI.

TABLE V (Charging Rule for Audio RTP Of Held Call)

| AVP | Value |
|---|---|
| Media-Component-Number | 1 |
| Flow-Number | 1 |
| Flow-Status | DISABLED |
| QCI | 1 |
| GBR-UL & GBR-DL | 38000 |
| MBR-UL & MBR-DL | 38000 |

TABLE VI (Charging Rule for Audio RTCP of Held Call)

| AVP | Value |
|---|---|
| Media-Component-Number | 1 |
| Flow-Number | 2 |
| Flow-Status | ENABLED |
| QCI | 1 |
| GBR-UL & GBR-DL | 1900 |
| MBR-UL & MBR-DL | 1900 |

As shown in Tables V and VI, the maximum GBR bandwidth that is to be reserved may be 38,000 bps for the RTP stream and 1900 for the RTCP stream. The maximum bandwidth for the RTCP stream may be set at approximately 5% of the RTP stream. The Flow-Status attribute is disabled for the RTP stream and enabled for the RTCP stream.

Referring back to FIG. 4, PGW 225, PCRF 240, and CSCF 250 may exchange additional messages relating to the establishment of the VoLTE held call, including AAA message 465 and RAA message 470. When the call is determined to be authorized, a SIP 200 OK message (message 475) may be sent to UE 205. PGW 225 may then send Update Bearer Request message 480 to SGW 215 and MME 220. Update Bearer Request message 480 may cause the updating of the bearer traffic flows (e.g., the RTP stream and RTCP stream) over which the voice call is implemented. The required bandwidth for the created bearer traffic flows may be calculated by PGW 225 by aggregating the requested bandwidth of all the GBR flows in the charging rules. In this example there are two charging rules, of which the first charging rule (Table V, charging rule for audio RTP of the held call) includes a 38,000 bps GBR bandwidth request (for the RTP stream) and the second charging rule includes a 1,900 bps GBR bandwidth request (for the RTCP stream). The aggregate of these two values may correspond to the total bandwidth allocated on the RAN interface between UE 205 and BS 210. In some existing systems, when determining the total bandwidth allocated the "Flow-Status" field in the charging rules for the RTP and RTCP stream may be ignored. Thus, bandwidth may be reserved even for disabled traffic streams.

In the scenario described above for a call hold in a VoLTE system, excess bandwidth may be reserved and thus wasted in the RAN. In the example of FIG. 4, 39,900 bps may be reserved on the RAN, despite the fact that the 38,000 bps corresponding to the RTP stream may not be used because the call is on hold. In addition to held call situations, other types of calls may similarly result in wasted RAN bandwidth. For example, situations in which a multiple calls are simultaneously put on hold, conference bridge situations, 3-way calling situations, and call waiting situations may all be scenarios in which excessive RAN bandwidth is reserved.

Figure 5:
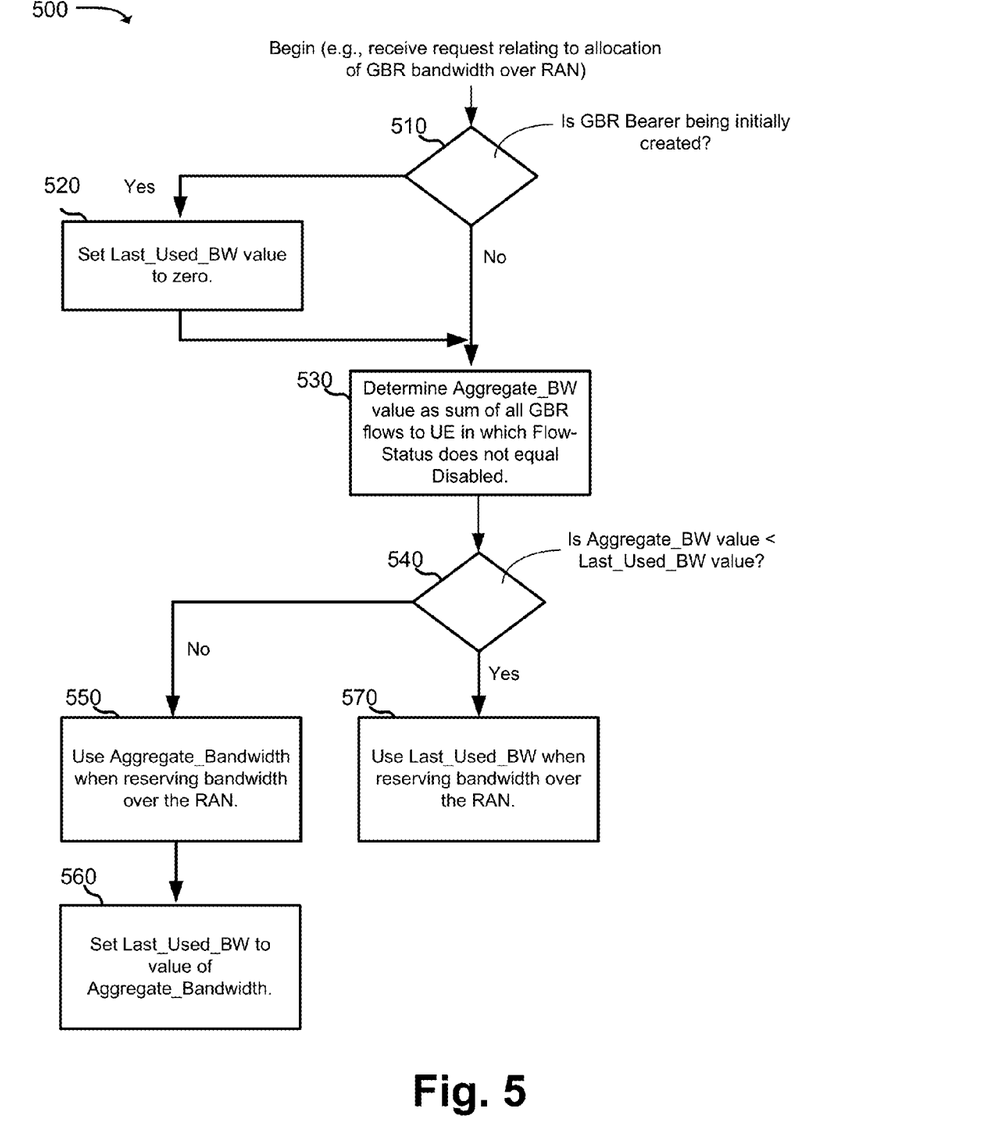
FIG. 5 is a flow chart illustrating an example process for improving RAN bandwidth efficiency during certain VoLTE call scenarios.

FIG. 5 is a flow chart illustrating an example process 500 for improving RAN bandwidth efficiency during certain VoLTE call scenarios. Process 500 may be implemented, for example, by PGW 225. In some implementations, process 500 may be implemented by a configurable list of PGWs 225 in environment 200; or a particular PGW 225 may implement process 500 only for a certain (configurable) list of IMS servers and/or UEs.

In one implementation, process 500 may be initiated, at PGW 225, in response to a message relating to the allocation of GBR bandwidth over the RAN. For example, as described in FIGS. 3 and 4, a RAR message (e.g., messages 315 or 460 in FIGS. 3 and 4) may be received by PGW 225, which may lead to reservation of bandwidth over the RAN (e.g., at a base station 210) via a Create Bearer or Update Bearer Request message.

Process 500 may include determining whether a GBR bearer is being initially created for a UE (block 510). For example, PGW 225 may keep track of the GBR bearer flows that are created between a particular base station 210 and a particular UE 205. As previously mentioned, a GBR bearer traffic flow, at the RAN level, may result in the reservation of radio resources of a base station 210. A GBR bearer traffic flow may be initially created, for example, as part of the setup of a VoLTE call (e.g., PGW 225 may issue a Create Bearer message, such as Create Bearer message 335 in FIG. 3, when it determines that a GBR bearer traffic flow should be created).

When a GBR bearer is being initially created (block 510—YES), process 500 may include setting a value, shown as "Last_Used_BW", to zero (block 520). This variable may be used to keep track of the last used bandwidth amount that is allocated to a particular UE 205, at a particular base station 210. With block 520, Last_Used_BW may be set to zero when bandwidth was not previously reserved for the bearer.

Process 500 may include, in response to the Last_Used_BW value being set to zero (block 520) or in response to a determination that a GBR bearer is not being initially created (block 510—NO), determining a value, shown as "Aggregate_BW," as the sum of the bandwidth of all the GBR flows, corresponding to a particular bearer (e.g., a particular UE 205), in which the Flow-Status attribute is not set to Disabled (block 530). The determination may be based on the media component description and/or charging rules that are processed by PGW 225 as part of the VoLTE call flow.

As an example of the application of block 530, consider the signal flow of the call hold example discussed above with reference to FIG. 4. The charging rule for the audio RTP of the held call (illustrated in Table V), indicates that the GBR bandwidth is 38,000 bps. The Flow-Status shoot of this charging rule, however, is set to Disabled. The GBR bandwidth for this charging rule may thus be ignored (i.e., not summed) when determining the value of Aggregate_BW. The value for Aggregate_BW may thus be determined to be 1,900, which may be calculated as zero (bandwidth for the charging rule corresponding to Table V) plus 1,900 (bandwidth for the charging rule corresponding to Table VI).

Process 500 may further include determining whether Aggregate_BW is less than Last_Used_BW (block 450). When this determination is false (block 540—NO), the value of Aggregate_BW may be used when reserving bandwidth over the RAN (block 550). For example, in the call flow of a VoLTE call, an Update Bearer Request message may be sent in which the bandwidth of the GBR traffic flows, included in the Update Bearer Request message, may be set to the value of Aggregate_BW. In response, base station 210 may correspondingly allocate radio resources corresponding to Aggregate_BW.

Process 500 may further include, after block 550, setting the value of Last_Used_BW to the value of Aggregate_BW (block 560). In this manner, in the next iteration of process 500 for the particular bearer, the value of Last_Used_BW will be equal to the previous value of Aggregate_BW.

When the determination of block 540 is true (block 540—YES), the value of Last_Used_BW may be used when reserving bandwidth over the RAN (block 570). For example, the Update Bearer Request message may include a bandwidth of the GBR traffic flows that is set to the value of Last_Used_BW. In response, base station 210 may correspondingly allocate radio resources corresponding to Last_Used_BW.

In process 500, by aggregating bandwidth for charging rules based on charging rules in which the Flow-Status attribute is not disabled, RAN bandwidth may be efficiently allocated relative to techniques that do not use this attribute when determining bandwidth to reserve. By keeping track of Last_Used_BW, hysteresis may be employed to ensure that bandwidth is not under-allocated in the RAN. Additionally, the use of hysteresis may avoid fluctuations in the reserved bandwidth in the RAN for the duration of an IMS session. Hysteresis may also ensure that the RAN bandwidth stays reserved for a UE until a call, that is on hold, is resumed.

As a further example of the application of process 500, consider a full set of charging rules for a held call between three UEs, which will be referred to as UE-A, UE-B, and UE-C. In this example, UE-A may be initially on a call with UE-B. UE-A may place UE-B on hold to implement a call with UE-C. Four charging rules may be associated with this call and processed by PGW 225. These four charging rules may include the following attributes:

Charging Rule One (RTP flow of held call for UE-B): Flow-Status=Disabled, Reserved BW=38000
Charging Rule Two (RTCP flow of held call for UE-B): Flow-Status=Enabled, Reserved BW=1900:
Charging Rule Three (RTP flow of held call for UE-C): Flow-Status=Enabled, Reserved BW=38000
Charging Rule Four (RTCP held call for UE-C): Flow-Status=Enabled, Reserved BW=0

Thus, the call flow corresponding to the audio with the call to UE-B is Disabled, as UE-B corresponds to the held call. The audio RTP flow with UE-C is Enabled and the audio RTCP flows (control flows) with both UE-B and UE-C are Enabled. The GBR values for the four flows are: 38000 (RTP flow with UE-B), 38000 (RTP flow with UE-C), 1900 (RTCP flow with UE-C), and 0 (RTCP flow with UE-C). Pursuant to process 500, Aggregate_BW may be calculated as the bandwidth needed for one RTP flow and one RTCP flow (38000+1900). In contrast, with existing techniques in which PGW 225 may ignore the Flow-Status attribute during bandwidth aggregation, the GBR bandwidth may be calculated as 77,900 bps (38000+38000+1900+0).

Figure 6:
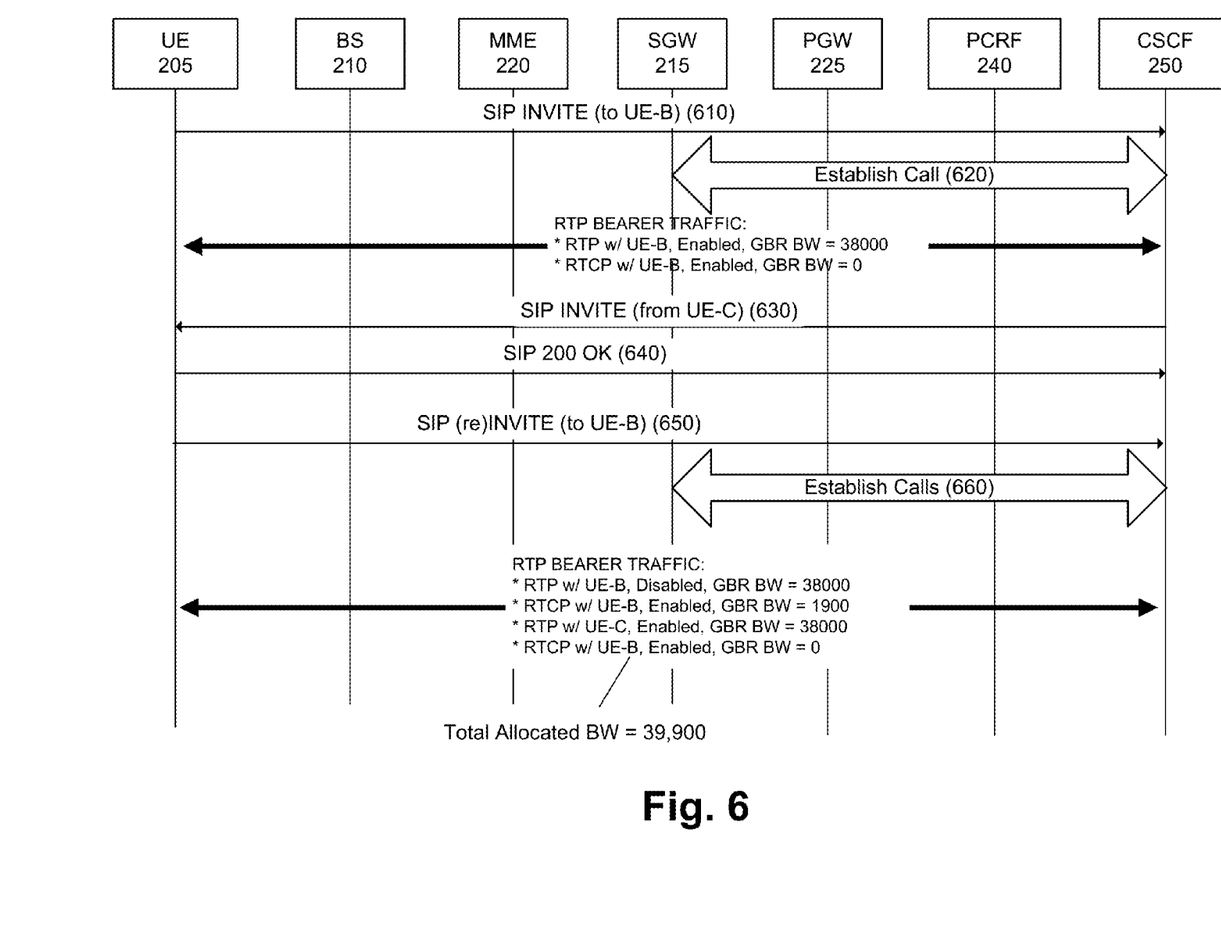
FIG. 6 is a diagram illustrating signaling in an environment in a VoLTE call waiting scenario.

FIG. 6 is a diagram illustrating signaling in environment 200 in a VoLTE call waiting scenario. The signaling shown in FIG. 6 may generally correspond to the call hold scenario discussed above (e.g., corresponding to the charging rules shown in Table VII). In FIG. 6, for clarity, a number of the more detailed signaling messages shown in FIGS. 3 and 4 (e.g., the RAR, AAR, and RAA messages) have been omitted.

As illustrated, UE-A may initiate a call to UE-B via a SIP INVITE message (610). The SIP INVITE message may result in a number of control messages (Establish Call 620) that result in the establishment of charging rules and the allocation of the RTP traffic flows for the call between UE-A and UE-B. Two GBR bearer traffic flows may be identified in the charging rules: (1) an RTP flow with UE-B that is enabled and indicates GBR bandwidth of 38000; and (2) an RTCP flow with UE-B that is enabled and indicates GBR bandwidth of zero.

At some point, assume that UE-A receives a call from UE-C, which the user of UE-A decides to accept and put the user of UE-B on hold. UE-A may receive a SIP INVITE message from UE-C (630) and respond with a SIP 200 OK message (640). UE-B may also send a SIP (re)INVITE message 650 to UE-B to put UE-B on hold. These messages may result in a number of control messages (Establish Calls 660) that result in the establishment of charging rules and the allocation of the RTP traffic flows for the call between UE-A and UE-C, and the held call between UE-A and UE-B. Four GBR bearer traffic flows may be identified in the charging rules: (1) an RTP flow with UE-B that is disabled and indicates GBR bandwidth of 38000; (2) an RTCP flow with UE-B that is enabled and indicates GBR bandwidth of 1900 (3) an RTP flow with UE-C that is enabled and indicates GBR bandwidth of 38000; and (4) an RTCP flow with UE-B that is enabled and indicates GBR bandwidth of zero. As discussed above, with aspects described herein, PGW 225 may calculate the actual bandwidth to reserve, at the corresponding base station 210 for UE-A, as 39,900 bps (38,000 plus 1,900).

In addition to held call situations, other VoLTE call scenarios may result in effective RAN bandwidth allocation. For example during a 3-way call, more than three times the needed bandwidth may be reserved temporarily when the UE has two held calls and establishes a third call leg to a conference bridge. The techniques described herein may effectively allocate bandwidth in these other call scenarios.

Figure 7:
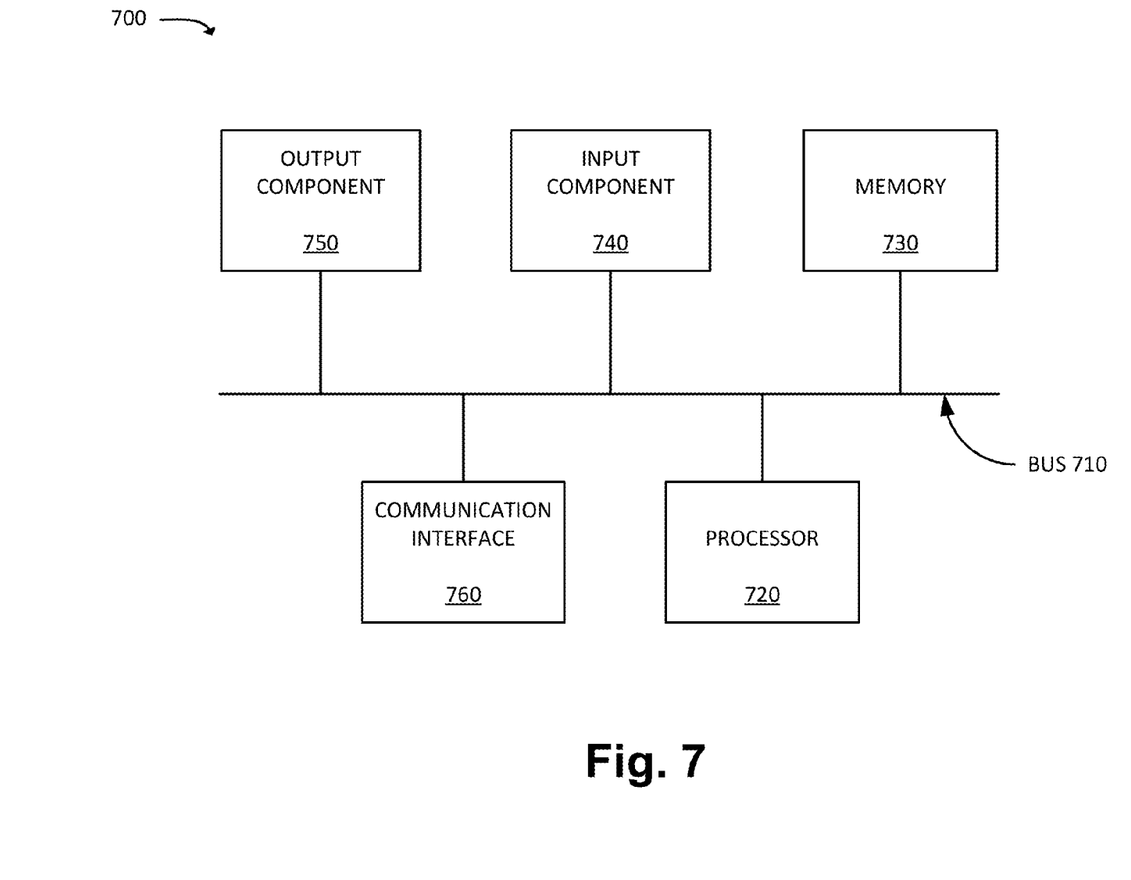
FIG. 7 is a diagram of example components of a device.

FIG. 7 is a diagram of example components of a device 700. Each of the devices illustrated in FIGS. 1-4 and 6 may include one or more devices 700. Device 700 may include bus 710, processor 720, memory 730, input component 740, output component 750, and communication interface 760. In another implementation, device 700 may include additional, fewer, different, or differently arranged components.

Bus 710 may include one or more communication paths that permit communication among the components of device 700. Processor 720 may include a processor, microprocessor, or processing logic that may interpret and execute instructions. Memory 730 may include any type of dynamic storage device that may store information and instructions for execution by processor 720, and/or any type of non-volatile storage device that may store information for use by processor 720.

Input component 740 may include a mechanism that permits an operator to input information to device 700, such as a keyboard, a keypad, a button, a switch, etc. Output component 750 may include a mechanism that outputs information to the operator, such as a display, a speaker, one or more light emitting diodes ("LEDs"), etc.

Communication interface 760 may include any transceiver-like mechanism that enables device 700 to communicate with other devices and/or systems. For example, communication interface 760 may include an Ethernet interface, an optical interface, a coaxial interface, or the like. Communication interface 760 may include a wireless communication device, such as an infrared ("IR") receiver, a Bluetooth radio, or the like. The wireless communication device may be coupled to an external device, such as a remote control, a wireless keyboard, a mobile telephone, etc. In some embodiments, device 700 may include more than one communication interface 760. For instance, device 700 may include an optical interface and an Ethernet interface.

Device 700 may perform certain operations described above. Device 700 may perform these operations in response to processor 720 executing software instructions stored in a computer-readable medium, such as memory 730. A computer-readable medium may be defined as a non-transitory memory device. A memory device may include space within a single physical memory device or spread across multiple physical memory devices. The software instructions may be read into memory 730 from another computer-readable medium or from another device. The software instructions stored in memory 730 may cause processor 720 to perform processes described herein. Alternatively, hardwired circuitry may be used in place of or in combination with software instructions to implement processes described herein. Thus, implementations described herein are not limited to any specific combination of hardware circuitry and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks has been described with regard to FIG. 5, the order of the blocks may be modified in other implementations. Further, non-dependent blocks may be performed in parallel. Additionally, while example signals are shown in FIGS. 3, 4, and 6, other signals may be sent and/or received before and/or after the signals shown in these figures, in other implementations.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as "logic" that performs one or more functions. This logic may include hardware, such as an ASIC or a FPGA, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Further, the phrase "based on" is intended to mean "based, at least in part, on" unless explicitly stated otherwise.

What is claimed is:

1. A method comprising:
receiving, by one or more devices, a request relating to an existing voice over long term evolution (VoLTE) service or to establishment of a VoLTE service, the request being associated with one or more network charging rules that define corresponding traffic flows associated with guaranteed bit rate (GBR) bandwidths and traffic flow statuses;
determining, by the one or more devices, an aggregate bandwidth value of those of the one or more charging rules that are associated with a particular bearer, the aggregate bandwidth value being determined based on:
summing of those of the one or more charging rules that are associated with the particular bearer and in which the traffic flow status of the corresponding traffic flow is not equal to a disabled status;
comparing, by the one or more devices, the aggregate bandwidth value to a previous version of the aggregate bandwidth value; and
causing reservation for the existing or the established VoLTE service, by the one or more devices and based on the comparison, of an amount of GBR bandwidth corresponding to the aggregate bandwidth value or the previous version of the aggregate bandwidth value.

2. The method of claim 1, wherein causing the reservation of the amount of GBR bandwidth includes:
causing reservation of the amount of GBR bandwidth corresponding to the previous version of the aggregate bandwidth value when the comparison indicates that the aggregate bandwidth value is less than the previous version of the aggregate bandwidth value; and causing reservation of the amount of GBR bandwidth corresponding to the aggregate bandwidth value when the comparison indicates that the aggregate bandwidth value is not less than the previous version of the aggregate bandwidth value.

3. The method of claim 1, wherein the request includes a Re-Authenticate-Request (RAR) message.

4. The method of claim 1, wherein the one or more devices include a packet data network gateway (PGW) associated with a long term evolution (LTE) network.

5. The method of claim 1, wherein causing the reservation of the amount of GBR bandwidth includes:

causing the reservation of the amount of GBR bandwidth in a radio access network (RAN) that provides wireless network connectivity to user equipment.

6. The method of claim 1, wherein the amount of GBR bandwidth is reserved for the particular bearer.

7. The method of claim 6, further comprising:

setting the previous version of the aggregate bandwidth value to zero when bandwidth was not previously reserved for the particular bearer.

8. The method of claim 1, wherein the request relating to the existing VoLTE service or the establishment of the VoLTE service includes a request relating to call waiting, call hold, conference call bridging, or 3-way calling situations.

9. A device comprising:

a memory; and at least one processor to execute instructions in the memory to:

receive a request relating to an existing voice over long term evolution (VoLTE) service or to establishment of a VoLTE service, the request being associated with one or more network charging rules that define corresponding traffic flows associated with guaranteed bit rate (GBR) bandwidths and traffic flow statuses;

determine an aggregate bandwidth value of those of the one or more charging rules that are associated with a particular bearer, the aggregate bandwidth value being determined based on:

summing of those of the one or more charging rules that are associated with the particular bearer and in which the traffic flow status of the corresponding traffic flow is not equal to a disabled status;

comparing the aggregate bandwidth value to a previous version of the aggregate bandwidth value; and causing reservation, based on the comparison, of an amount of GBR bandwidth corresponding to the aggregate bandwidth value or the previous version of the aggregate bandwidth value.

10. The device of claim 9, wherein, when causing the reservation of the amount of GBR bandwidth, the at least one processor is to further execute instructions in the memory to:

cause the reservation of the amount of GBR bandwidth corresponding to the previous version of the aggregate bandwidth value when the comparison indicates that the aggregate bandwidth value is less than the previous version of the aggregate bandwidth value; and cause the reservation of the amount of GBR bandwidth corresponding to the aggregate bandwidth value when the comparison indicates that the aggregate bandwidth value is not less than the previous version of the aggregate bandwidth value.

11. The device of claim 9, wherein the one or more devices include a packet data network gateway (PGW) associated with a long term evolution (LTE) network.

12. The device of claim 9, wherein, when reserving the amount of GBR bandwidth, the at least one processor is to further execute instructions in the memory to:

cause the reservation of the amount of GBR bandwidth in a radio access network (RAN) that provides wireless network connectivity to user equipment.

13. The device of claim 9, wherein the amount of GBR bandwidth is reserved for the particular bearer.

14. The device of claim 13, wherein the at least one processor is to further execute instructions in the memory to:

set the previous version of the aggregate bandwidth value to zero when bandwidth was not previously reserved for the particular bearer.

15. A method comprising:

receiving, by one or more devices, a request, relating to voice over long term evolution (VoLTE) services, associated with traffic flows for a particular user equipment (UE) that attaches to a network via a wireless interface, each of the traffic flows being associated with an amount of guaranteed bit rate (GBR) traffic;

selectively summing, by the one or more devices, the GBR traffic associated with the traffic flows, to obtain an aggregate bandwidth value;

comparing, by the one or more devices, the aggregate bandwidth value to a previous version of the aggregate bandwidth value;

causing reservation, by the one or more devices and based on the comparison, of an amount of GBR bandwidth corresponding to the previous version of the aggregate bandwidth value when the comparison indicates that the aggregate bandwidth value is less than the previous version of the aggregate bandwidth value; and causing reservation, by the one or more devices and based on the comparison, of an amount of GBR bandwidth corresponding to the aggregate bandwidth value when the comparison indicates that the aggregate bandwidth value is not less than the previous version of the aggregate bandwidth value.

16. The method of claim 15, wherein each of the traffic flows is additionally associated with a flow status, and wherein the selectively summing further includes:

excluding, from the sum, those of the traffic flows in which a corresponding flow status is set to disabled.

17. The method of claim 15, wherein the one or more devices include a packet data network gateway (PGW) associated with a long term evolution (LTE) network.

18. The method of claim 15, wherein causing reservation of the amount of GBR bandwidth includes:

causing the reservation of the amount of GBR bandwidth in a radio access network (RAN) that provides wireless network connectivity to user equipment.

19. The method of claim 15, wherein the amount of GBR bandwidth is reserved for the particular UE.

20. The method of claim 19, further comprising:

setting the previous version of the aggregate bandwidth value to zero when bandwidth was not previously reserved for the particular UE.

* * * * *